F. A. PARKHURST.
MOLD AND PROCESS OF CASTING.
APPLICATION FILED APR. 20, 1918.

1,296,597.

Patented Mar. 4, 1919.
7 SHEETS—SHEET 1.

Inventor
F. A. Parkhurst,
by Ray S. Gehr
attorney

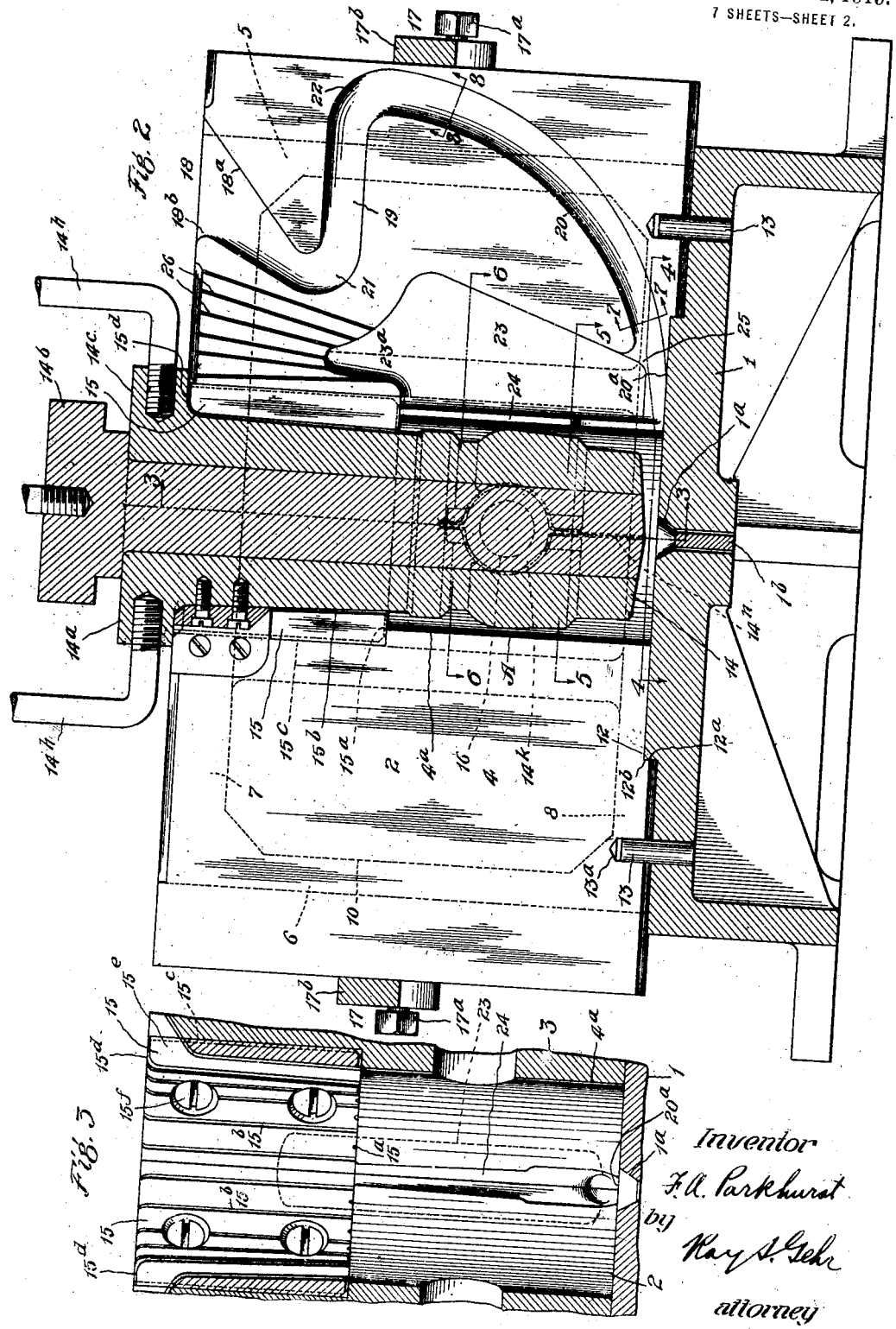

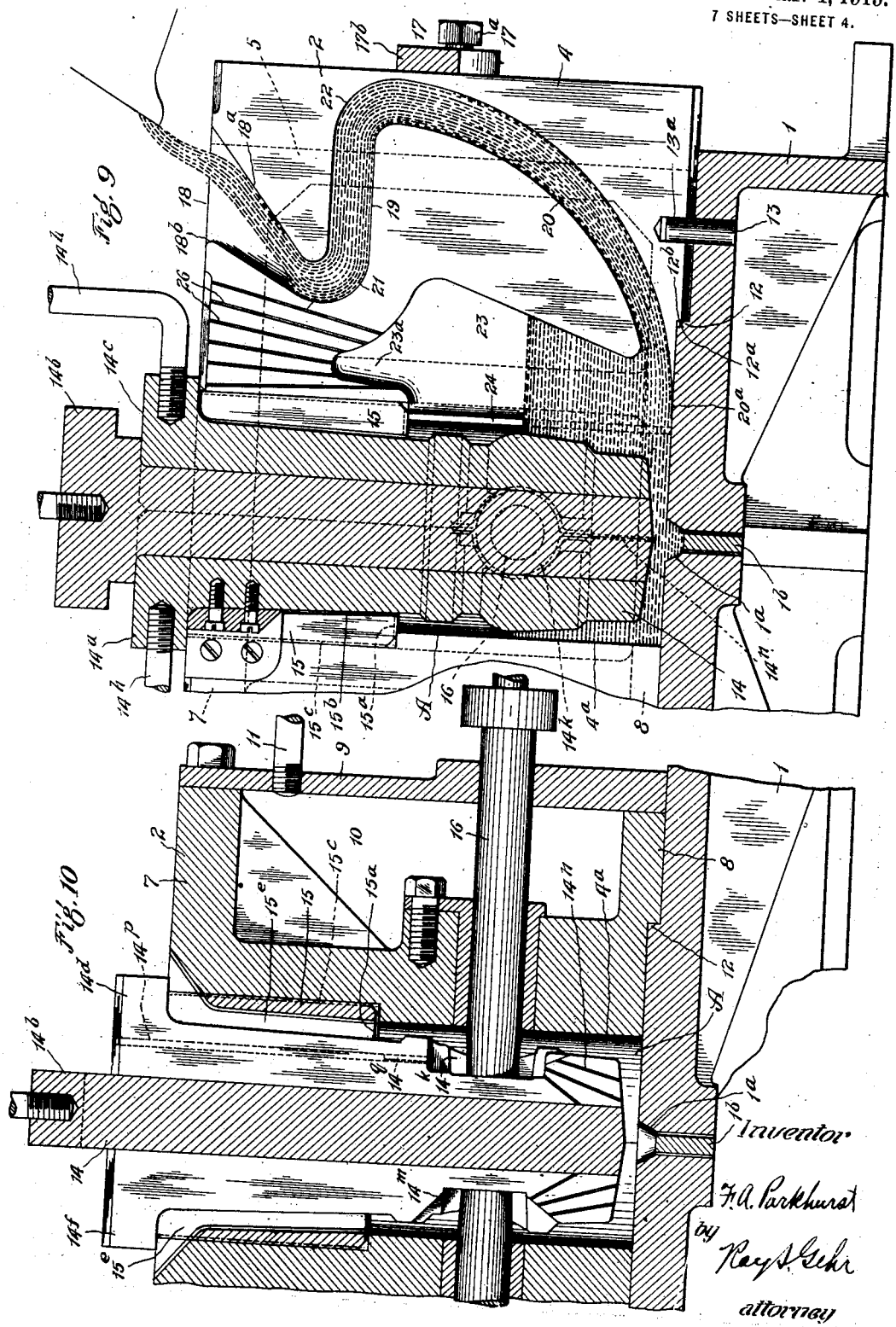

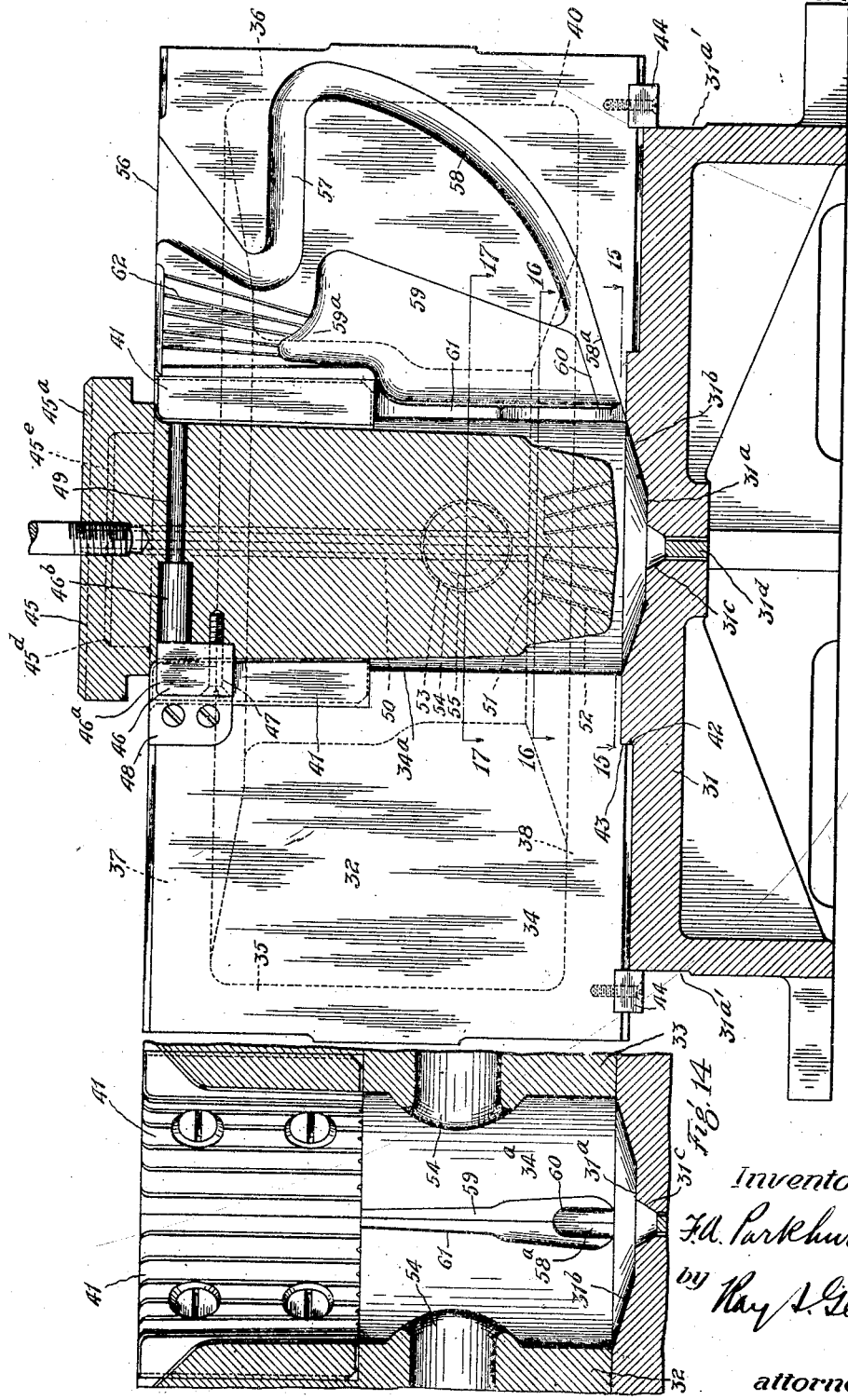

F. A. PARKHURST.
MOLD AND PROCESS OF CASTING.
APPLICATION FILED APR. 20, 1918.

1,296,597.

Patented Mar. 4, 1919.
7 SHEETS—SHEET 6.

Inventor
F. A. Parkhurst
by
Ray J. Gehr
attorney

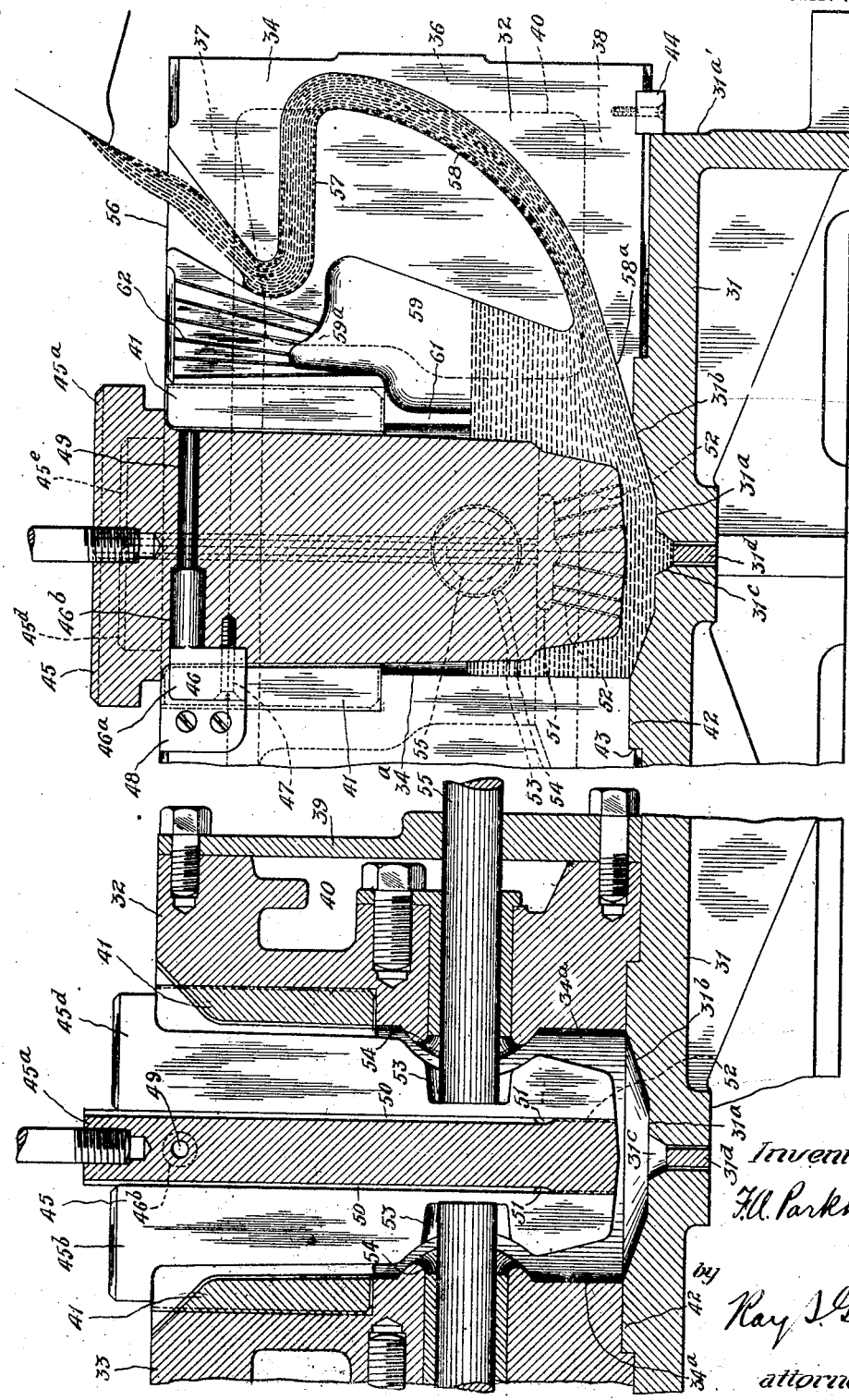

UNITED STATES PATENT OFFICE.

FREDERIC A. PARKHURST, OF CLEVELAND, OHIO, ASSIGNOR TO THE ALUMINUM CASTINGS COMPANY, OF CLEVELAND, OHIO, A CORPORATION OF OHIO.

MOLD AND PROCESS OF CASTING.

1,296,597.

Specification of Letters Patent.

Patented Mar. 4, 1919.

Application filed April 20, 1918. Serial No. 229,708.

*To all whom it may concern:*

Be it known that I, FREDERIC A. PARKHURST, a citizen of the United States, residing at Cleveland, in the county of Cuyahoga and State of Ohio, have invented certain new and useful Improvements in Molds and Processes of Casting, of which the following is a specification, reference being had therein to the accompanying drawings.

My invention relates to permanent molds adapted for casting articles from metals and metallic alloys, such as aluminum and aluminum alloys, and it has been developed in connection with molds of the type invented by J. H. Bamberg, then of Buffalo, New York, and A. B. Norton, then of Detroit, Michigan, said molds being especially adapted for the production of cup-shaped castings such as skirted or trunk pistons for internal combustion engines. More particularly, my improvements have to do with the gate of the mold and the means for venting the mold cavity, and to an improved process of introducing the molten metal into the mold cavity.

One of the objects of my invention is the provision of an improved form of gate for molds having substantially all of the advantages of the prior forms of construction above referred to and which is exceedingly compact in form whether used for the production of large and tall castings, on the one hand, or small and short castings, on the other hand, so that a mold of minimum size and weight is secured for castings of any size.

A further object of my invention is the provision of an improved gate for molds to produce chambered castings of any size, such as hollow cylinders, and cup-shaped articles, the form of the gate being such that in every case the bulk of scrap metal in the gate will be reduced to a minimum, and especially the bulk of that part of the gate metal which adheres to the casting and must be removed by a cutting operation of some sort.

Another object of my invention is the provision of a mold in which splashing and breaking up of the molten metal is not only avoided as the first metal enters the bottom of the mold cavity but is rendered quite impossible during the later stages of the pouring, so that occlusion of air and gases and consequent porosity or blow holes in the casting are avoided whether the castings be large or small in size or heavy or light in cross section.

Another object of my invention is the provision of a mold gate having an upright feeder section and means for supplying molten metal thereto in such a way that the hot entering metal passes through the mass of metal in the feeder, or at any rate acts to renew the heat of the entire mass of metal in the feeder section so that it is maintained in a molten state and acts effectively to make up for crystallization shrinkage during freezing of the metal in the mold cavity proper.

Other objects of my invention contemplate the provision of a mold gate which, in a simple and effective manner, prevents oxids and other impurities lighter than the molten metal from entering the mold cavity and also prevents air from being drawn into the gate and mold cavity with the entering metal.

Further objects of the invention contemplate the provision of an improved process of introducing molten metal into the mold cavity in a manner preventing agitation and splashing of the metal in said cavity throughout the pouring operation and in a manner to insure complete filling of the cavity and to prevent occlusion of air in the metal of the casting.

A further object of my invention is the attainment of the other objects, above mentioned, by means of a mold construction that obviates the necessity of highly skilled or expert handling in the production of castings.

For the purpose of illustrating and explaining my invention I have shown two typical embodiments thereof in the accompanying drawings.

Fig. 2 is a vertical section on the line 2—2, Fig. 1.

Fig. 3 is a fragmentary vertical section on the line 3—3 with the core parts removed.

Figure 8:
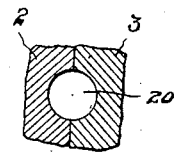
Figure 7:
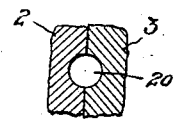

Figs. 7 and 8 are fragmentary sections on the lines 7—7 and 8—8, respectively, Fig. 2.

Fig. 9 is a fragmentary vertical section taken on the same line as Fig. 2 but showing the pouring of the molten metal into the mold.

Figure 1:
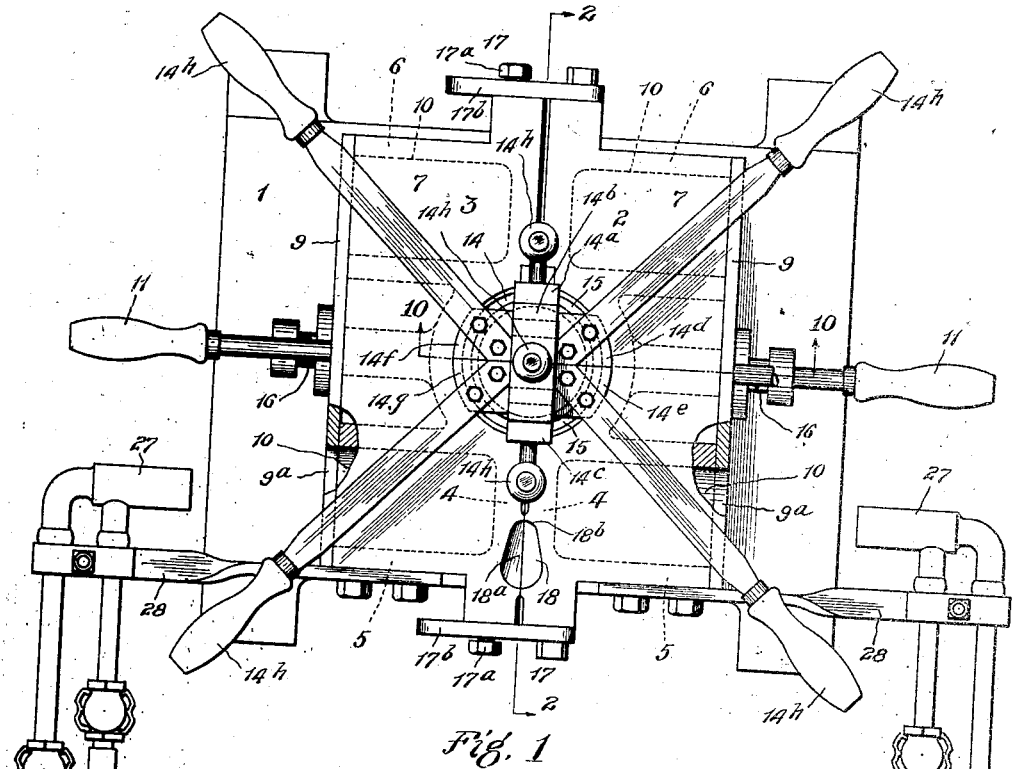
Figure 1 is a top plan view of a mold having my improved form of gate.

Fig. 10 is a fragmentary vertical section on the line 10—10, Fig. 1.

Figure 11:
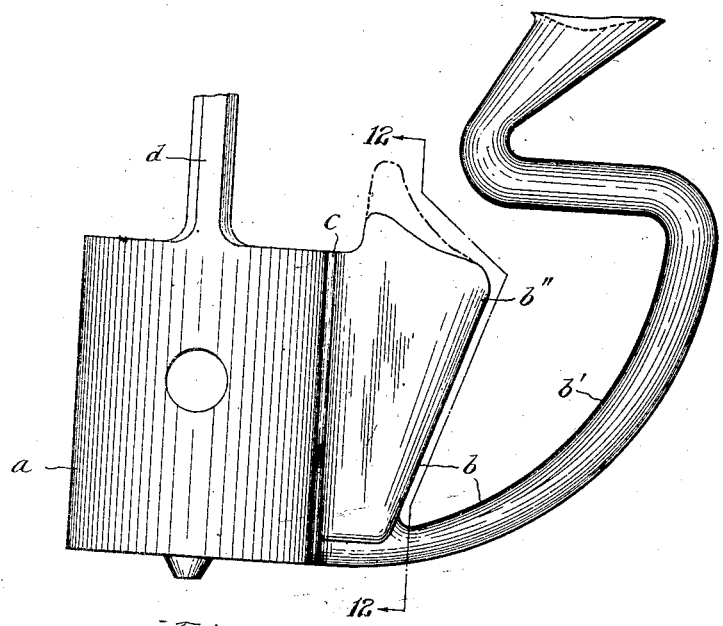

Fig. 11 is a side elevation of the casting as it comes from the mold, the gate metal being shown attached to the casting proper.

Figure 12:
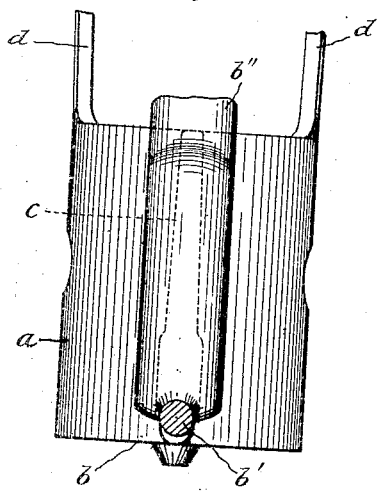

Fig. 12 is a section on the broken line 12—12, Fig. 11.

Fig. 13 is a view of the same character as Fig. 2 but showing a modified form of construction.

Fig. 14 is a fragmentary vertical section at right angles to the section of Fig. 13 with the core parts removed.

Figure 15:
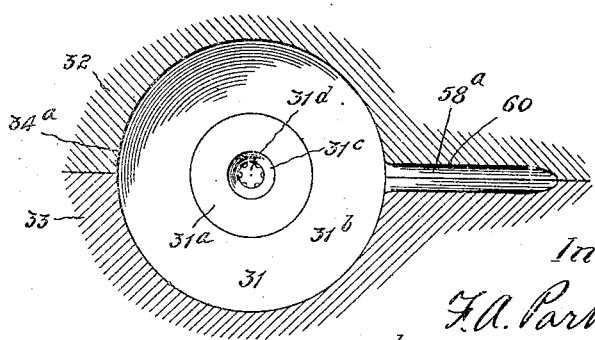

Fig. 15 is a horizontal section on the broken line 15—15, Fig. 13.

Figure 16:
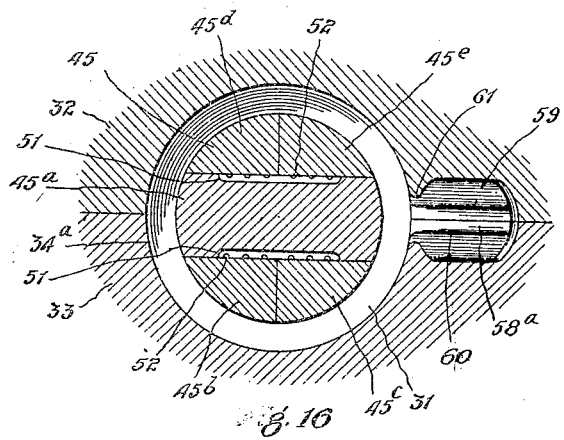

Fig. 16 is a horizontal section on the line 16—16, Fig. 13.

Figure 17:
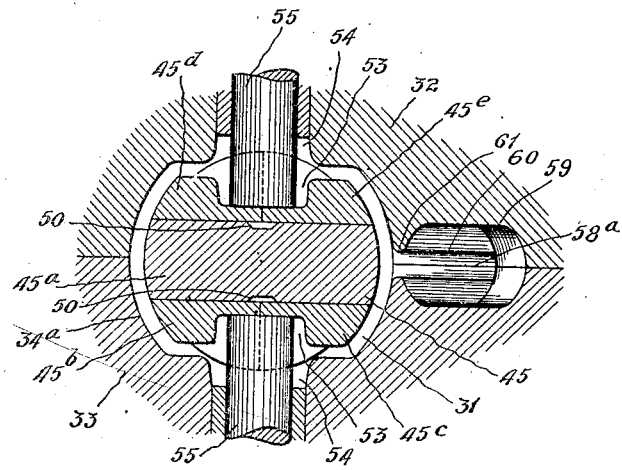

Fig. 17 is a horizontal section on the line 17—17, Fig. 13.

Fig. 18 is a fragmentary vertical section similar to Fig. 13 but illustrating the pouring of the molten metal into the mold.

Fig. 19 is a fragmentary vertical section on a line at right angles to the section of Fig. 13.

Each of the two forms of construction illustrated in the drawings shows my invention embodied in a permanent mold designed for the casting of aluminum alloy engine pistons of relatively large size. Referring to the first form of construction as illustrated in Figs. 1 to 12, inclusive, the mold as shown comprises a plurality of parts adapted when assembled to form a mold cavity, A, for the piston casting proper. The mold body includes a base member 1 and two complementary chambered side members 2, 3 which are movable on the base toward and from each other and thus provide for the removal of the castings in the operation of the mold. These three main sections of the mold body are preferably formed from cast iron.

Each of the complementary members 2 and 3 comprises an inner side wall 4, end walls 5 and 6 and top and bottom walls 7 and 8 respectively. The outer side of each of the complementary members is formed by a plate 9 bolted to the casting, thus closing the interior chamber 10 of the member. Handles 11, 11 are secured to the plates 9, 9 so that the side members of the mold can conveniently be moved to and from operative position on the base.

The inner side walls 4 of the complementary members of the mold body mutually engage when said members are moved together, as shown in Fig. 1. Each wall 4 is formed between its ends with a semi-cylindrical portion $4^a$ and the lower parts of these semi-cylindrical walls $4^a$ form the outer side wall of the mold cavity proper, the bottom of said cavity being formed by the upper face of the base 1. Said face is formed with a central depression $1^a$ which provides for a "workspot" on the head of the piston casting. The bottom wall of this depression is formed by plug $1^b$ which is grooved on its periphery to provide vents for air and gases.

12 indicates devices by means of which the mold members 3, 4 are properly positioned on the base 2 and brought into alinement when moved together. The devices 12 may comprise an annular shoulder $12^a$ on the base 1 and a coöperating shoulder $12^b$ formed in each of the side members 2, 3. The coöperating shoulders $12^a$ and $12^b$ are struck from the same axis and thus serve to effect a perfect positioning of the mold members in relation to each other.

Separate alining and positioning devices may be used either supplemental to or as a substitute for the devices 12. For example I have shown upstanding pins 13 mounted in the base 1 and recesses $13^a$ for said pins formed in the opposite faces of the walls 4. When the side members of the mold are moved together the recesses $13^a$ embrace the pins 13 and thus cause proper alinement of the mold members.

The mold is provided with a main core 14 which is preferably made of steel and of the character shown and described in my pending application, Serial No. 194,189 to which reference can be had for a detailed description. For the purpose of the present application it will suffice to state that the core comprises parts $14^a$, $14^b$, $14^c$, $14^d$, $14^e$, $14^f$ and $14^g$ which when assembled are adapted to be supported at their upper ends in the mold body so as to depend within the cavity formed therein. Each of the core parts is provided with a suitable handle $14^h$ to facilitate assembling of the core in the mold and its removal therefrom.

The core members $14^d$ and $14^e$ are shaped to form a recess $14^k$ to provide for a wrist pin boss on the casting, while the members $14^f$, $14^g$ are shaped to form a recess $14^m$ for a similar purpose. The abutting faces of the members $14^d$, $14^e$ and $14^f$, $14^g$ are formed with vent grooves $14^n$ extending from the lower surface of the core upward to the boss recesses $14^k$ and $14^m$. One of each of the two mentioned pairs of core parts can be formed with a vent passage 14p extending upward from the wrist pin boss recess to the upper end of the core (see Fig. 10) this vent passage being provided at its lower end with a grooved plug 14q.

Above the mold cavity proper the semi-cylindrical walls 4a are recessed to receive a pair of liners 15, 15, the lower ends of which serve to form the annular top wall of the mold cavity. Each of these liners is formed with vent grooves 15a, 15b, 15c and 15d on its bottom, inner, outer and top sides respectively. Each liner is also preferably formed with an upwardly extending recess 15e which is large enough to permit the molten metal to rise in it and thus forms a capacious vent for air and gases so that a complete filling of the mold cavity is absolutely insured.

The liners 15 are suitably secured to the members 2, 3 as by screws 15f. It will be seen from inspection of Fig. 2 that the main core fits within and is supported by the liners 15, and when the core is thus supported the mold cavity takes substantially a cup-shape corresponding to the trunk or skirted piston which it is desired to cast.

16, 16 are removable core pins slidably mounted in the mold members 2, 3 with their inner ends projecting into the boss recesses 14k, 14m.

In the operation of the mold the various parts are secured in operative position by lock devices 17, 17 each of which comprises a pin 17a mounted on one of the side members of the mold and a coöperating pivoted hook 17b on the other side member. When the side members 2, 3 are brought together in proper position on the base 1 the hooks 17b are forced down over the pins 17a so that the parts of the mold body are firmly secured together.

I turn now to a description of the gate of the mold to which my present improvements more directly relate. The gate, which is formed by alining depressions or recesses in the adjacent walls 4, 4 of the mold members 2 and 3, in its entirety comprises a supply conduit and what I term a feeder. The supply conduit has a funnel shaped inlet section 18 inclined downwardly and laterally toward the mold cavity, a check or control section 19 which extends laterally, and preferably horizontally, away from the mold cavity, and a discharge section 20 which extends from the control section downwardly and laterally toward the bottom of the mold cavity. The discharge end of the inlet section 18 communicates through a curved connecting section 21 with the receiving end of the control section 19, while the latter section and the discharge section are connected by a curved or rounded section 22.

On reference to Fig. 2 it will be noted that the inlet section 18 has its wall 18a extending entirely across the mouth of the inlet section; that is to say the lower end of the wall 18a extends to the left of a vertical line through the left side 18b of the mouth of said inlet section. As a result, the metal poured into the gate is of necessity received upon the inclined surface 18a and by it directed into the curved section 21 in such a manner that the stream of metal is projected across the conduit so as to form an effective seal against the entrance of air.

The discharge section 20 of the gate preferably gradually decreases in cross section from its upper to its lower end and sweeps in an easy curve downwardly and laterally with the bottom wall of its lower end substantially tangential at 20a to the upper surface of the mold base forming the bottom wall of the mold cavity.

Figures 4, 5:
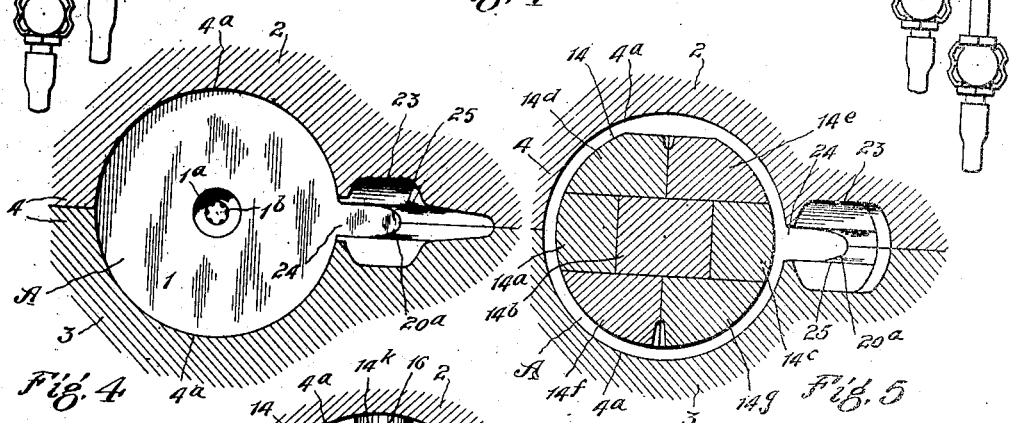
Fig. 4 is a horizontal section on the broken line 4—4, Fig. 2.
Fig. 5 is a horizontal section on the line 5—5, Fig. 2.
Figure 6:
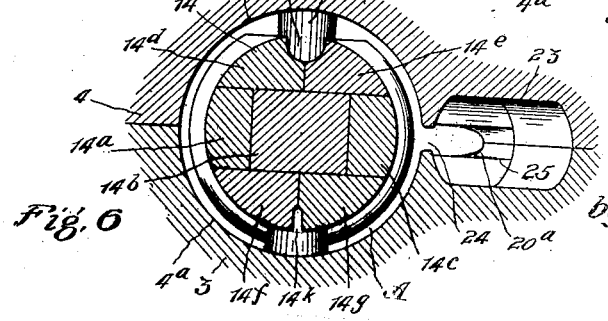
Fig. 6 is a horizontal section on the line 6—6, Fig. 2.

Adjacent one side of the mold cavity and lying between said cavity and the supply conduit of the gate, is the feeder section 23. This feeder is in the form of an upright cavity designed to receive molten metal introduced through the supply conduit of the gate and feed it at higher levels into the annular section of the mold cavity. In order to do this the feeder must have communication with the mold cavity proper at different levels and preferably such communication is effected through a short and relatively narrow passage 24 which affords communication from the feeder to the mold cavity from the bottom to the top of the latter. Molten metal introduced through the supply conduit may be admitted to the feeder in any suitable manner but I prefer to provide a direct communication by an opening 25 between the lower discharge end of the section 20 of the conduit and the lower end of the feeder as indicated in Figs. 2 and 5. The cross sectional area of the feeder increases from its lower to its upper end, as indicated in Figs. 2, 5 and 6. The feeder has at its upper end an upward extension or riser 23a. This riser tapers somewhat toward its upper end as shown in Fig. 2. To provide for the escape of air or gases which are forced upward into the riser as the molten metal rises in the cavity the adjacent faces of the mold members 2 and 3 are formed with vent grooves 26 extending from the upper part of the riser 23a to the top of the mold.

It is usually desirable to provide for heating the body of the metal to maintain it at a suitable temperature and I have shown burners 27, 27 mounted on brackets 28, 28 said burners being arranged so that their flames are directed through openings 9a in the plates 9 to heat the inner walls of the mold members 2 and 3 and especially the parts of the walls 4 in which the gate is formed, this arrangement insuring that the metal in the gate shall remain molten longer than that in the mold proper.

Preferably the walls of the mold, including core parts, which constitute the walls for the mold cavity are suitably coated or treated in well known manner to reduce as much as possible agitation of the molten metal as it flows into contact therewith and to insure proper setting of the metal within the cavity.

In the operation of the mold above described the members 2 and 3 are first moved into operative position on the base 1, then the sections of the main core 14 are inserted, the locking devices 17 are driven home to tightly lock the mold members 2 and 3 together and firmly clamp the main core in position. Finally the core pins 16 are introduced.

The temperatures at which the various parts are maintained will depend largely upon the nature of the metal or alloy to be cast. Assuming that the burners 27 have been operated to heat the mold parts to the desired temperature, the mold is now ready to receive the molten metal. Said metal is brought to the mold in any suitable manner, as by a ladle, and is poured into the inlet 18 of the gate in some such manner as indicated in Fig. 9. Because of the peculiar formation of the inlet 18 the entering metal is forced to first strike the inclined wall 18$^a$ which, as has been stated, directs it into the curved section 21 of the gate conduit. The abrupt change of direction of the conduit at this point, together with the manner in which the metal is directed into the bend by the said inclined wall 18$^a$, not only causes the metal to form an effective seal to prevent entraining of air but also to effectively stop the entrance of metallic oxids or other impurities having a lower specific gravity than the molten metal. As the stream of metal, directed by the wall 18$^a$, encounters the abrupt but smoothly rounded bend 21 its velocity is greatly checked, both by the abrupt change of the direction of flow and by the horizontal direction of the checking or controlling section 19 in which the effect of gravity on the velocity of the metal is suspended. Even if there were no checking or choking back of the metal in the bend 21, it is clear that the molten metal projected in a solid stream from the wall 18$^a$ across the passage-way would form an effective seal against the entrance of air under the entraining action of the flowing stream of metal, especially as there is practically always a clearance for the escape of air upward between the stream of metal on the inclined wall 18$^a$ and the overlying inclined wall of the inlet section 18. But in addition to the liquid seal thus formed, the flow of the metal is checked by its change of direction and consequently backs up and entirely fills the bend 21 so that the upper free surface of the entering stream of metal terminates in the inlet section at a level more or less above the control section 19. Thus it will be seen that oxids or other impurities floating on the surface of the entering stream of metal are arrested in the inlet section and their entrance into the mold cavity prevented.

By reason of the retardation of the flow of the metal in the bend 21 and the control section 19, it emerges from the latter into the curved section 22 with a reduced velocity and encounters the gently curving wall of the downwardly and laterally extending discharge section 20 smoothly and without agitation.

In the said discharge section 20 a further check on the velocity of the metal is provided by the gradual contraction of the passage from its upper toward its lower end, so that practically throughout the length of the supply conduit of the gate an adequate control of the velocity of the metal is afforded to insure a smooth and steady flow.

Thus the first metal entering the mold, substantially free from admixed air and impurities, emerging from the discharge section 20 of the gate, flows smoothly and in an unbroken stream or mass into the mold cavity, spreading freely and without agitation or splashing over the bottom wall thereof, so that no air or gas is mixed into the metal. As will readily be understood the avoidance of agitation of the entering metal and of resulting occlusion of air or gases is accomplished by the checking of the velocity of the metal and by the gradual change of its direction as it passes through the easily curving discharge section 20 so that it finally emerges from it upon the bottom wall of the mold cavity along lines substantially parallel thereto and at a relatively low velocity.

As the molten metal continues to flow into the mold its upper surface, in the mold cavity proper, comes into contact with the lower end of the core 14, the air above the metal either finding its way radially outward and into the annular part of the cavity into which it is free to rise or, entering the vent grooves 14$^n$, finds its way through these grooves to the boss recesses 14$^k$, 14$^m$ and thence into the annular section of the cavity or into the vent passage or passages 14$^p$ which lead to the exterior of the mold. It may be observed in this connection that the venting of the air or gases overlying the relatively quiescent mass of rising metal is readily effected in the manner last described, but if there is splashing or agitation of the metal in the mold air or gas is occluded in it and I have found it practically impossible to separate such air or gas, no matter how adequate the provision for venting may be, so that a serious porosity of the casting results. This is especially true of the metal first entering the mold because it seems especially difficult to separate occluded air or gas bubbles from the body of the metal which rises upward into contact with the lower end of the main core. It is also particularly true in the case of castings having heavy cross sections, it being always more difficult in such cases, apparently, to eliminate air or gases that become occluded in the metal. It will thus be seen that the practical importance of avoiding splashing of the metal in the mold cavity is very great.

As the molten metal rises in the annular section of the mold cavity it simultaneously rises into the feeder 23 and if, at any stage of the pouring, the level of the metal rises more slowly in the mold cavity than in the feeder, the metal in the feeder will flow smoothly through the passage 24 into the mold cavity and find its way in both directions around the main core to the diametrically opposite side of the cavity. As the passage 24 extends continuously from the bottom to the top of the mold cavity this smooth and unagitated flow of metal from the feeder into the mold cavity can occur at any level until the cavity is entirely filled. Thereupon, by reason of the hydraulic head of the metal in the supply conduit of the gate, the flow through said conduit continues, the more highly molten entering metal rising upward through the somewhat cooler metal in the feeder to the upper part thereof so that toward the close of the pouring the metal is forced upward into the riser 23ª and also into the vent risers 15ᵉ, a thorough filling of the mold cavity being thus insured.

In prior permanent mold practice, there has been an undue proportion of imperfect castings resulting from "misruns", or from failure of the mold to completely fill. This has been attributed to various causes, but I have found that it is largely, if not entirely, due to a failure to provide adequate venting for the air in the mold cavity. And I have practically entirely overcome this difficulty and source of loss by the provision of one or more large vent passages leading upwardly from the top of the mold cavity and affording an extremely free passage for the air from the mold cavity to the outer air. These large vent openings, of course, permit the molten metal to rise within them and form projections on the castings which must be later removed, but the cost of doing this is relatively small in comparison with the losses due to imperfect castings which have been experienced in the prior practice.

In the filling of a mold cavity in the shape of a hollow cylinder or of a cup-shaped mold cavity such as that of the present mold, the molten metal gives up its heat to the walls of the mold and tends to freeze first at points remote from the gate or source of supply and then gradually and progressively from said remote points around the main core toward the gate. It will thus be understood that it is important to maintain in the feeder section of the gate a molten mass of metal upon which the metal in all parts of the mold cavity is free to draw to make up for crystallization shrinkage as the freezing progresses. In my improved form of gate the molten condition of the metal in the feeder section is maintained to the very end of the pouring operation so that an adequate supply of molten metal is maintained in position to enter the mold cavity at any level to compensate for crystallization shrinkage and a progressive setting of the metal in the mold is insured from points opposite the gate around the main core in both directions, then in the short passage 24 between the cavity and the feeder and finally in the feeder itself.

After a short interval to permit the metal to set, the locking devices 17 are eased off, the core parts are withdrawn, the pins 16 somewhat in advance of the main core parts, then the locking devices 17 are entirely disengaged and the mold members 2 and 3 separated to permit the removal of the casting.

The casting, as it comes from the mold, is shown in Figs. 11 and 12. $a$ is the piston casting proper. $b$ designates the gate metal in its entirety the latter comprising the slender section $b'$ formed in the supply conduit of the gate and the heavier section $b''$ formed in the riser. The gate metal is joined to the piston casting $a$ by the relatively slender neck $c$. $d$ represents upward extensions formed in the vent risers. On comparison of the upper part of the gate metal $b''$ with the form of the feeder section of the gate, the contraction of said gate metal to make up for crystallization shrinkage when the metal of the casting sets, is apparent, and it will be clear that my form of gate provides an adequate body of metal, exterior to but in communication with the mold cavity, which can be drawn upon to make up for the said crystallization shrinkage. When the casting is removed from the mold the slender section $b'$ is readily broken from the heavier section $b''$, the latter metal and the riser metal $d$ being removed from the piston by any suitable cutting operation. A band saw can be effectively used to separate the riser metal $b''$ at the neck $c$ and also to remove the riser metal $d$.

It will be observed that in my improved process of introducing molten metal into the mold, ($a$) agitation and splashing of the first entering metal, with consequent occlusion of air, is avoided; ($b$) the metal, throughout the pouring, is introduced into the mold or feeder cavity at the bottom thereof so that the level of the molten metal in said cavities rises smoothly and gradually under the pressure of the head in the supply conduit of the gate and with an entire absence of splashing and agitation, (c) the air in the mold cavity, as it is forced by the rising molten metal, finds an exceedingly free exit through the large vent passages so that the mold cavity is invariably completely filled, and (d) the last entering molten metal passing upward through the feeder to fill the riser extension thereof, further heats the metal in the feeder and insures it being maintained in the molten state as a reservoir to make up for crystallization shrinkage until the metal in the mold cavity proper has frozen.

The above described mold is designed for the production of a piston with a flat head. In Figs. 13 to 19 inclusive I have shown my invention embodied in a mold for the production of pistons with raised or crowned heads. In this latter construction the body of the mold comprises a base member 31, and complementary side members 32, 33 mounted thereon. Each of the side members has a side wall 34, end walls 35, 36 and top and bottom walls 37 and 38, all cast integral. And to the outer side of this chambered casting is secured a plate 39 which thus serves to close the interior chamber 40. As in the case of the first described construction, each wall 34 is formed with a semi-cylindrical portion $34^a$, the lower parts of which form the outer side wall of the mold cavity while the upper parts are recessed to receive curved liners 41 which are screwed to the members 32, 33 and form the upper annular wall of the mold cavity proper. These liners have their bottom, inner, outer and top surfaces formed with vent grooves as in the first described construction.

The bottom wall of the mold cavity is formed by a depression in the base 31 having an annular horizontal surface $31^a$ and a surrounding, annular, inclined surface $31^b$. A central recess $31^c$ provides for a "workspot" on the casting, the bottom of this recess being formed by a plug $31^d$ which is formed with vent grooves.

The base is formed with an upstanding cylindrical shoulder 42 and the side members 32 and 33 are formed with coöperating shoulders 43 which serve, when brought into engagement with the shoulder 42 to accurately position and aline the mold members in relation to each other. To facilitate movement of the side members 32 and 33 into and out of operative position I have provided each of the side members 32 and 33 with a pair of depending flanges or tongues 44, 44 which are arranged to slidably engage the accurately surfaced sides $31^{a'}$ of the base 31. This guiding device is especially advantageous in the production of large size castings which necessitate relatively large and heavy mold parts.

The main core 45 is of the five part type disclosed in the application of J. H. Bamberg, Serial No. 82,528, but embodies certain improvements which I have devised. The core comprises a central part $45^a$ and two pairs of members $45^b$, $45^c$ and $45^d$, $45^e$. These five core members, when introduced into the mold snugly fit and are supported by the liners 41. The central member $45^a$ is accurately positioned in the mold body by an improved key and slot construction which I have devised. Said central part $45^a$ is apertured to receive a key 46 comprising a rectangular or block section $46^a$ and a relatively long cylindrical part $46^b$. The cylindrical part $46^b$ is driven into the core member with a forced fit and the key is then secured by a single screw 47. The projecting block section $46^a$ of the key is received between wear plates 48 secured in slots in the mold members 32, 33 and their liners 41, 41. To facilitate the removal of the key 46 the core part $45^a$ is formed with a hole 49 into which a rod can be introduced to drive the key from its socket.

The main core 45 is provided with vent passages as follows: The middle part $45^a$ of the core is formed on its opposite flat faces with longitudinal passages 50, 50 each of which extends from the upper end of the core part to a transverse passage 51 near the lower end of the core part. Then these flat faces of the core part are formed at their lower ends with a series of vent grooves 52 extending from the bottom of the core upward to the transverse passage 51. An adequate vent upward through the core is thus provided for air and gases collecting on the bottom surface of the core.

Each of the two pairs of core members $45^b$, $45^c$ and $45^d$, $45^e$ are formed with recesses 53, 53 to provide for interior wrist pin bosses on the piston casting, and alining exterior bosses are provided for by annular recesses 54 in the sides of the mold members 32, 33. To provide for the coring out of these wrist pin bosses core pins 55, 55 are slidably mounted in the mold members 32, 33 as in the first form of construction.

My improved form of gate as applied to the present mold is for the most part similar to the gate of the first described construction, the only material difference being incident to the fact that in the present construction the mold cavity is formed to provide a piston with a crowned head. Thus the gate comprises a supply conduit having an inlet section 56 a control section 57 and a discharge section 58, together with a feeder 59, these parts being of the same general character as the corresponding parts of the first described mold. In this case however the curve of the discharge section 58, instead of sweeping downward to the level of the bottom of the mold cavity, terminates at a higher level where it merges tangentially with a straight section 58ᵃ the bottom wall of which constitutes a straight line extension of the inclined surface 31ᵇ of the bottom of the mold. Thus, as in the first described mold, molten metal introduced through the supply conduit is discharged into the mold cavity on lines substantially parallel to the bottom wall thereof.

The lower end of the discharge section 58 communicates with the lower end of the feeder 59 through an opening 60, while the feeder in turn communicates with the mold cavity proper through a short relatively narrow passage 61 which extends from the bottom to the top of the cavity. Also, as in the first described mold, a riser 59ᵃ extends upward from the feeder 59 and is provided with vent grooves 62 which extend upward from the riser to the top of the mold.

The operation of this second form of construction is substantially the same as that of the first form of construction and will be understood without further description.

The manner in which the objects of my invention are attained in the above described constructions and the advantages of the same, also will readily be understood and appreciated. To summarize, it will be seen that the form and relative arrangement of the inlet section of the gate conduit and the smoothly rounded bend into which it delivers, insure the entering metal being directed in a smooth stream and without splashing into the said bend, regardless of the position in which the pouring ladle is held, so that mixing of air into the metal is avoided; that the form and relative arrangement of the inlet section, the said bend and the control section insure the formation of a liquid seal preventing air being entrained and drawn into the mold with the entering metal and cause a skimming or trapping action that prevents entrance into the mold cavity of oxids and other light impurities; that the molten metal, smoothly and uniformly introduced into the control section of the conduit, there has its velocity reduced and is then smoothly and without agitation delivered into the discharge section of the conduit which, by reason of its long radius curvature and its contraction, conveys the metal smoothly and without agitation downward and laterally toward the bottom of the mold cavity and delivers it into said cavity at a relatively low velocity and on lines substantially parallel to the bottom wall of said cavity so that the first entering metal is introduced into the cavity without splashing or agitation, and occlusion of air with resultant porosity is avoided; that, after the bottom part of the mold cavity is filled, the molten metal quietly rises in said cavity and in the feeder section of the gate, metal flowing from the feeder into the mold cavity if the level of the metal in the feeder rises more rapidly than in the mold cavity, until said cavity, by reason of the extremely free venting provided, is completely filled, whereupon a continued flow of the metal through the supply conduit and upward in the feeder to cause the filling of the riser extension of the feeder, insures the complete filling of the mold and the maintenance of a hot molten mass of metal in the feeder until after the freezing of the metal in the mold cavity proper so that porosity of the resultant casting incident to crystallization shrinkage is entirely overcome; that by the provision of a relatively small supply conduit adapted to deliver molten metal into the bottom of the mold cavity independently of the feeder, it is possible to control the velocity and direction of the first entering metal without any modification of the walls of the feeder section and consequent large variation of the bulk of the gate metal; that by the provision of such a supply conduit arranged to discharge directly into the bottom of the mold cavity and by the relative arrangement of its parts and of the feeder section of the gate the desired control of the direction and velocity of the metal entering the mold cavity is attained without undue expansion of the dimensions of the mold with consequent increase in its weight; and finally that these results are attained in a mold structure which can be operated with entire success by comparatively unskilled workers.

I have shown my invention only in connection with molds for the production of piston castings but it is obviously applicable in the production of castings of other articles and other forms and it will be understood that the foregoing disclosure is for purposes of illustration and explanation and not intended to define the scope of the invention.

What I claim is:

1. A mold having a cavity for the casting proper and provided with a gate comprising a conduit adapted to discharge molten metal into the bottom of the mold cavity and an upright feeder disposed at one side of the mold cavity, said feeder having an opening at its lower end to receive molten metal supplied through the said conduit and being adapted to feed said metal into the mold cavity at various levels ranging substantially from the bottom to the top thereof.

2. A mold having a cup-shaped cavity for the casting proper and provided with a gate comprising a conduit adapted to discharge molten metal into the bottom of the mold cavity and an upright feeder disposed at one side of the mold cavity, said feeder having an opening at its lower end to receive molten metal supplied through the said conduit and being adapted to feed said metal into the mold cavity at various levels ranging substantially from the bottom to the top thereof.

3. A mold having a cavity for the casting proper and provided with a gate comprising a conduit adapted to conduct the first entering molten metal into the bottom of the cavity on lines approximately tangential to the bottom wall of said cavity and an upright feeder having an opening in its bottom part to receive molten metal supplied through said conduit and being adapted to feed said molten metal into the mold cavity at various levels ranging substantially from the bottom to the top thereof.

4. A mold having a cavity for the casting proper and provided with a gate comprising a conduit adapted to discharge molten metal into the bottom of the mold cavity and an upright feeder disposed at one side of the mold cavity, said feeder having an opening in its lower part to receive molten metal supplied through the said conduit and an extension which rises from its upper end above the top of the mold cavity and being adapted to feed the molten metal to the mold cavity at various levels ranging substantially from the bottom to the top thereof.

5. A mold having a cavity for the casting proper and provided with a gate comprising a conduit formed and arranged to deliver molten metal into the bottom of the mold cavity at a low velocity on lines approximately parallel to the bottom wall of said cavity and in an unbroken mass, and an upright feeder disposed at one side of the mold cavity, said feeder having an opening in its lower part to receive molten metal supplied through said conduit and being adapted to feed said metal into the mold cavity at various levels ranging substantially from the bottom to the top thereof.

6. A mold having a cavity for the casting proper and provided with a gate comprising a supply conduit having a downwardly and laterally extending inlet section, a control section extending at an angle to the inlet section and into which the inlet section delivers, and a downwardly and laterally inclined discharge section arranged to receive molten metal from the said control section and deliver it into the bottom of the mold cavity on lines substantially parallel to the bottom wall thereof.

7. A pouring gate for molds having a downwardly and laterally extending funnel shaped inlet affording a downwardly inclined wall adapted to receive the entering metal and extending entirely across the mouth of the gate, whereby the entering metal is uniformly directed by said inclined wall regardless of the position of the ladle from which the molten metal is poured.

8. A pouring gate for molds having a downwardly and laterally inclined funnel shaped inlet section providing an inclined, metal-receiving wall extending entirely across the mouth of said inlet section, a substantially horizontal check or control section into which the inlet section delivers, and a downwardly and laterally inclined discharge section arranged to receive the molten metal from the control section and deliver it into the bottom of the mold cavity on lines approximately parallel to the bottom wall thereof.

9. A mold having a cavity for the casting proper and provided with a gate at one side of the mold cavity comprising a downwardly extending inlet section, a control section extending laterally from the lower end of the inlet section away from the mold cavity, and a downwardly and laterally inclined discharge section arranged to receive metal from the control section and discharge it into the bottom of the mold cavity.

10. A mold having a cavity for the casting proper and provided with a gate at one side of the mold cavity comprising a downwardly extending inlet section, a control section extending laterally from the lower end of the inlet section away from the mold cavity, and a downwardly and laterally inclined discharge section arranged to receive metal from the control section and discharge it into the bottom of the mold cavity, and an upright feeder arranged between the said discharge section and the adjacent side of the mold cavity, said feeder having an opening in its lower part adapted to receive molten metal supplied through said discharge section and being adapted to feed said metal into the mold cavity at various levels.

11. A mold having a cavity for the casting proper and provided with a gate comprising a supply conduit having a downwardly and laterally inclined discharge section adapted to deliver molten metal into the bottom of the mold cavity on lines approximately parallel to the bottom wall thereof and an upright feeder arranged adjacent the mold cavity with its lower end communicating with said discharge section to receive molten metal therefrom and being adapted to feed said metal into the mold cavity at various levels.

12. A mold having a cup-shaped cavity for the casting proper and provided with a gate comprising a downwardly and laterally inclined supply conduit arranged to discharge molten metal into the bottom of the mold cavity, and an upright feeder arranged adjacent one side of the mold cavity with its lower end in communication with the said conduit to receive molten metal therefrom, said feeder being adapted to feed said molten metal into the mold cavity at various levels ranging substantially from the bottom to the top thereof and having an extension rising from its upper end above the top of the mold cavity.

13. A mold having a cavity for the casting proper, an upright feeder cavity at one side of the said mold cavity and communicating with the mold cavity from the bottom to the top thereof through a short narrow passage, and a gate supply conduit arranged to discharge into the bottom of the mold cavity and the feeder cavity.

14. A pouring gate for molds comprising a downwardly and laterally extending inlet section affording a downwardly inclined wall adapted to receive the entering metal, and a control section into which the said inlet section discharges and which extends at an angle with the inlet section, whereby the entering molten metal is directed across the gate passage-way as it leaves the said inclined wall of the inlet section and forms a seal preventing air being drawn into the gate with the flowing metal.

15. A pouring gate for molds comprising a downwardly and laterally extending inlet section affording a downwardly inclined wall adapted to receive the entering metal, and a control section into which the said inlet section discharges and which extends at an angle with the inlet section, whereby the flow of the molten metal is checked by said control section and a seal formed at the junction of the said inlet and control sections which prevents air and floating impurities being drawn through the gate with the flowing metal.

16. A mold having a cavity for the casting proper and provided with a pouring gate comprising a passage having an inlet opening at the upper part of the mold and extending downward from said inlet in a zigzag course with smoothly rounded bends and having a downwardly and laterally extending discharge section with downwardly converging walls and arranged to deliver the molten metal into the bottom of the mold cavity without agitation.

17. A mold having a cavity for the casting proper and provided with a pouring gate comprising a downwardly inclined inlet section, a control section extending at an angle to the inlet section and into which the said inlet section delivers and a downwardly and laterally inclined discharge section extending at an angle to the control section and having downwardly converging walls and arranged to receive molten metal from said control section and deliver it into the bottom of the mold cavity without agitation.

18. A mold having a cavity for the casting proper, an upright feeder cavity at one side of the said mold cavity and communicating with the mold cavity at various levels between the bottom and the top thereof through a short narrow passage, and a gate supply conduit having a downwardly extending inlet section for receiving molten metal poured under the action of gravity and being arranged to discharge into the bottom of the mold cavity and the feeder cavity.

19. The method of introducing molten aluminum alloys or the like into a mold which consists in pouring the molten metal under the action of gravity and delivering it into the bottom of the mold cavity proper and an upright feeder cavity arranged at one side of the mold cavity, and causing the metal to rise in said mold and feeder cavities from the bottom thereof as the pouring continues and to flow from said feeder at various levels into the mold cavity proper to compensate for crystallization shrinkage.

20. The method of introducing into a mold molten metals having high crystallization shrinkage which consists in conducting the first entering metal into the bottom of the mold cavity at a low velocity and without splashing, then directing the entering metal into the bottoms of both the mold cavity proper and an upright feeder cavity arranged at one side of the mold cavity, and causing the metal to rise in said mold and feeder cavities from the bottoms thereof as the pouring continues and to flow from said feeder at various levels into the mold cavity proper to compensate for crystallization shrinkage.

21. The method of introducing into a mold molten metals having high crystallization shrinkage which consists in conducting the first entering metal into the bottom of the mold cavity at a low velocity and without splashing, then directing the entering metal into the bottoms of both the mold cavity proper and an upright feeder cavity arranged at one side of the mold cavity and communicating therewith at various levels and causing the metal to rise in said mold and feeder cavities as the pouring continues until the mold cavity is filled, and then conducting additional molten metal into the bottom of the feeder cavity and causing the metal therein to rise into a riser extension of the feeder cavity, whereby the heat of the last entering metal insures a molten condition of the metal in the feeder cavity during solidification of the metal in the mold cavity proper.

22. The method of introducing into a mold molten metals having high crystallization shrinkage which consists in delivering the metal into the bottoms of the mold cavity proper and an upright feeder cavity arranged at one side of the mold cavity, causing the metal to rise in said mold and feeder cavity from the bottoms thereof as the pouring continues and simultaneously conducting air and gases from the mold cavity through a large free passage leading from the top of said cavity to the atmosphere until the mold cavity is filled, and causing molten metal to flow from the feeder at various levels into the mold cavity proper to compensate for crystallization shrinkage.

23. The method of introducing molten metal into a mold which includes conducting the metal under the action of gravity from the upper part of the mold downward in a zigzag course to retard the velocity of the metal and then conducting it through a downwardly and laterally inclined passage having downwardly converging walls which further retard the velocity of the metal and finally delivering the metal in a smooth stream into the bottom of the mold cavity.

In testimony whereof, I affix my signature.

FREDERIC A. PARKHURST.